US006934323B2

United States Patent
Hara

(10) Patent No.: US 6,934,323 B2
(45) Date of Patent: Aug. 23, 2005

(54) ADAPTIVE ARRAY ANTENNA-BASED CDMA RECEIVER THAT CAN FIND THE WEIGHT VECTORS WITH A REDUCED AMOUNT OF CALCULATIONS

(75) Inventor: Yoshitaka Hara, Yokosuka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 615 days.

(21) Appl. No.: 09/901,437

(22) Filed: Jul. 10, 2001

(65) Prior Publication Data

US 2002/0018517 A1 Feb. 14, 2002

(30) Foreign Application Priority Data

Jul. 10, 2000 (JP) ........................................ 2000-207849

(51) Int. Cl.[7] ................................................ H04K 1/00
(52) U.S. Cl. ...................... 375/152; 375/147; 375/347; 342/378
(58) Field of Search ................................. 375/130, 146, 375/147, 152, 267, 347; 342/378, 383

(56) References Cited

U.S. PATENT DOCUMENTS

| 5,933,446 | A |   | 8/1999 | Bond et al. |
| 6,031,877 | A |   | 2/2000 | Saunders |
| 6,064,338 | A | * | 5/2000 | Kobayakawa et al. ...... 342/378 |
| 6,128,332 | A | * | 10/2000 | Fukawa et al. ............. 375/146 |
| 6,304,750 | B1 | * | 10/2001 | Rashid-Farrokhi et al. . 455/137 |

FOREIGN PATENT DOCUMENTS

| EP | 0 999 652 A1 | 5/2000 |
| JP | 11-251964 | 9/1999 |
| JP | 11-274976 | 10/1999 |
| WO | WO 96/37976 | 11/1996 |
| WO | WO 00/16494 | 3/2000 |

OTHER PUBLICATIONS

"Adaptive Array for Mobile Radio (II) :Algorithm" by T. Ohgane et al.; IEICE Trans., vol. 82, No. 1; Jan. 1999; pp., 55–61; (w/partial English translation).

(Continued)

*Primary Examiner*—Temesghen Ghebretinsae
(74) *Attorney, Agent, or Firm*—McDermott Will & Emery LLP

(57) ABSTRACT

The amount of calculations involved in the weight calculation is reduced in an adaptive array antenna CDMA receiver. A common correlation matrix is calculated by using the reception signals. Preferably, the inverse matrix of the common correlation matrix is also calculated. The common correlation matrix or the inverse matrix is used in common to the weight calculations for all the users or mobile stations. An inventive CDMA receiver includes a portion provided for each user. Each of the portions passes the reception signals through the respective matched filters to obtain respective despread signals; calculates a weight vector by using the common correlation matrix or the inverse matrix thereof; weighs the respective despread signals with the weight vector to obtain weighed despread signals; and combines the weighed despread signals into the transmission signal associated with each user.

31 Claims, 10 Drawing Sheets

OTHER PUBLICATIONS

S. Tanaka, K.Higuchi, M. Sawahashi, and F. Adachi, Experiments On Coherent Adaptive Array Antenna Diversity For DS–CDMA Reverse Link, Technical Report of IEICE. RCS98–53, Jun. 1998, pp. 19–24.

S. Tanaka, A. Harada, M. Sawahashi, and F. Adachi, "Experiments On Adaptive Antenna Array Diversity For W–CDMA Mobile Radio Reverse Link," Technical Report of IEICE. RCS99–10, Apr. 1999, pp. 19–24.

Atsushi Harada, Shinya Tanaka, Taisuke Ihara, Mamoru Sawahashi, and Fumiyuki Adachi, "Field Experiments On Adaptive Antenna Array Transmit Diversity In W–CDMA Forward Link," Technical Report of IEICE. RCS99–157, Nov. 1999, pp. 115–121.

Naguib, A. F., et al., "Performance of Wireless CDMA with M–ary Orthogonal Modulation and Cell Site Antenna Arrays", IEEE Journal on Selected Areas in Communications, vol. 14, No. 9, Dec. 1, 1996, pp. 1770–1783. (XP–000639640).

* cited by examiner

ANTENNA SIGNAL PROCESSING SYSTEM

ADAPTIVE ARRAY ANTENNA-BASED CDMA RECEIVER THAT CAN FIND THE WEIGHT VECTORS WITH A REDUCED AMOUNT OF CALCULATIONS

BACKGROUND OF THE INVENTION

1. Field of the Invention

The invention generally relates to an adaptive array antenna-based radio receiver of a base station used in a CDMA communications system and, more specifically, to an antenna signal processing system, provided in such a radio receiver, for receiving reception signals from a plurality (M) of antennas and detecting and extracting a channel signal from each of a plurality (N) of users or mobile stations.

2. Description of the Prior Art

Generally speaking, a user of a cellular radio or mobile telephone system communicates through a base station the service area of which includes the location of the user. Such a base station acquires a channel for communication with each of the terminals or users within the service area of the base station so as to set the environments to enable simultaneous multiple communications. Recently, CDMA (code-division multiple access) is attracting great attention as one of such multiplexing techniques.

In a DCMA system, multiplexing is achieved by using, for a plurality of users, respective different spreading codes. For example, a transmission signal for each of the N users is expressed as:

$$x_i(t) = \alpha \cdot c_i(t) \cdot d_i(t) \cdot \exp(j2\pi ft), \quad (1)$$

where $\alpha$ is a propagation coefficient, $c_i(t)$ is a spreading code allocated to an i-th user, $c_i(t)$ is a datum to be transmitted, f is the frequency of the carrier wave, and i=1, 2, 3, ..., N, where N is the number of users the receiver can provide with radio telephone service. However, we usually omit the subscripts, simply denoting, e.g., x(t), c(t) and d(t) except when the discussion involves any relationship between different communications or channels. The data or the value of the transmission signal is updated every unit period Td of time. Similarly, the spreading code c(t) is updated every period Tc of time. The ratio between the data update period Td and the spreading code update period Tc is referred to as spreading gain G. The spreading gain G=Td/Tc is usually so set as to be an integer equal to or more than one.

In a CDMA system, the transmission data signals $d_1(t)$, $d_2(t)$, ..., $d_N(t)$ of N users served by a certain base station are multiplied by respective spreading codes $c_1(t)$, $c_2(t)$, ..., $c_N(t)$. For each $c_i(t)$ of the spreading codes (or possible channels), a CDMA receiver is provided with a spreading code-matched filter $MF_i$ for extracting the data $d_i(t)$ from the received signal. The extracted signal or the signal, in the base band, passed through each matched filter $MF_i$ is given as:

$$y_i(t) = \alpha \cdot G \cdot d_i(t). \quad (2)$$

In this way, using matched filters enable simultaneous reception of signals from a plurality of users. Though the number of users served by a base station is limited by the number of spreading codes and the amount of interference among channels, a rapid increase in the number of subscribers of mobile telephone service requires each base station to accommodate more subscribers. In order to cope with this situation, various receivers each incorporating an adaptive array antenna have been proposed so far.

There are reports concerning CDMA receivers with an adaptive array antenna in the following references:

(1) Tanaka, Higuchi, Sawahashi and Adachi, "Indoor Transmission Test Characteristics of DS-CDMA Adaptive Array Antenna Diversity", IEICE (The Institute of Electronics, Information and Communication Engineers), Radio Communication System Society Technical Report RCS98-53, June 1998, pp. 19–24.

(2) Tanaka, Harada, Sawahashi and Adachi, "Outdoor Transmission Test of Adaptive Antenna Array Diversity Reception in DS-CDMA" IEICE, Radio Communication System Society Technical Report RCS99-10, April 1999, pp. 19–24.

(3) Harada, Tanaka, Ihara, Sawahashi and Adachi, "The Results of Indoor Transmission Test of Adaptive Antenna Array Transmission Diversity in a W-CDMA down link" IEICE, Radio Communication System Society Technical Report RCS99-157, November 1999, pp. 115–121.

(4) Ohgane and Ogawa, "The Adaptive Array and Mobile Communications (II)", IEICE Trans., Vol. 82, No. 1, January 1999, pp. 55–61.

Also, though various adaptive array algorithms have been proposed so far, the SMI (Sample Matrix Inversion) algorithm, the RLS (Recursive Least Squares) algorithm and the LMS (Least Mean Square) algorithm are better used among others as described in reference (4). The SMI and RLS algorithms, which both involve the calculation of correlation matrices of input signals, are fast in convergence but requires a large amount of calculations, while the LMS algorithm is less in the amount of calculations but slow in convergence. In this connection, all of references (1) through (3) use the LMS algorithm.

FIG. 1 is a schematic block diagram showing a structure of a conventional adaptive array antenna portion in a multi-user CDMA receiver. In FIG. 1, the adaptive array antenna portion 1 comprises M radio portions 10-1 through 10-M which each include an antenna (not shown) constituting an antennal array (not shown), and an antenna signal procession system 20. The antenna signal procession system 20 comprises N adaptive array signal processors 100-1 through 100-N provided for available channels CH1 through CHN or the users supported by the CDMA receiver or the base station including the CDMA receiver (M=4 in this specific example). In each of the radio portions 10, a reception signal received by the antenna is subjected to a frequency conversion and a synchronous detection to become a complex baseband signal xj (j=1, 2, . . . , M), which has an in-phase component as the real part and a quadrature component as the imaginary part. The complex baseband signals x1 through xM (x4 in this example) output from the radio portions 10 are supplied to each signal processor 100-i.

FIG. 2 is a block diagram showing a structure of each adaptive array signal processor 100-i of FIG. 1. It is assumed that the signal processors 100 use above-mentioned SMI algorithm for example. In FIG. 2, the signal processor 100-i comprises M matched filters MFi 111 which are configured to match a spreading code ci(t), an adaptive array weight calculator 112-i, M weight multipliers 113 and a signal combiner 114. The adaptive array signal processors 100-1 through 100-N are identical to each other in structure except that the matched filters MF1 through MFN of signal processors 100-1 through 100-N are so configured as to match respective spreading codes c1(t) through cN(t).

In FIG. 2, i.e., in each signal processor 100-i, the baseband signals x1 through x4 from the radio portions 10 are applied to the matched filters 111 in a one-to-one correspondence and despread into despread signals $y_{i,1}$, $y_{i,2}$, $y_{i,3}$, and $y_{i,1}$, which are supplied to the adaptive array weight calculator 112-i and to respective one of the M weight multipliers 113.

The adaptive array weight calculator 112-i calculates a correlation matrix $\Phi i$ and a response vector $Ui$, and then calculates a weight vector $Wi$ expressed as:

$$Wi = \Phi i^{-1} \cdot Ui. \tag{3}$$

where $\Phi i^{-1}$ is an inverse matrix of $\Phi i$.

The correlation matrix $\Phi i$ is given by:

$$\Phi_i = E\left\{ \begin{bmatrix} y_1 y_1^* & y_1 y_2^* & y_1 y_3^* & y_1 y_4^* \\ y_2 y_1^* & y_2 y_2^* & y_2 y_3^* & y_2 y_4^* \\ y_3 y_1^* & y_3 y_2^* & y_3 y_3^* & y_3 y_4^* \\ y_4 y_1^* & y_4 y_2^* & y_4 y_3^* & y_4 y_4^* \end{bmatrix} \right\} \tag{4}$$

where $A^*$ is a complex conjugate to A, and $E\{B\}$ indicates a mean of matrices B for a lot of data samples. It is noted that the subscript "i" of each variable $y_{i,j}$ (j=1, 2, 3, 4) has been omitted in the above expression. In expression (4), each element of the matrix indicates a correlation between signals from matched filters 111. The calculation of the correlation matrix $\Phi i$, which involves an averaging for data samples, is usually conducted in a time area in which the radio propagation environment is less changeable. The value of the correlation matrix $\Phi i$ is updated when the radio propagation environment has changed.

The response vector $Ui$ is calculated by using reference signals included in the despread signals $y_{i,1}$ through $y_{i,4}$. Specifically, the weight calculator 112-i filters the signals $y_{i,1}$ through $y_{i,4}$ with respective filters each configured to match the reference signals included in the signals $y_{i,1}$ through $y_{i,4}$ to obtain filtered signals $u_{i,1}$ through $u_{i,4}$, which yields the response vector $Ui$ as follows:

$$Ui = \begin{pmatrix} u_1 \\ u_2 \\ u_3 \\ u_4 \end{pmatrix}. \tag{5}$$

It is noted that the subscript "i" of each variable $u_{i,j}$ (j=1, 2, 3, 4) has been omitted in the above expression. The calculated vector elements $u_{i,1}$ through $u_{i,4}$ is used by the weight multipliers 113 to multiply the despread signals $Y_{i,1}$ through $y_{i,4}$, respectively. The output signals from the weight multipliers 113 are combined by the combiner 114 to yield a channel signal $zi$ associated with an i-th user or mobile station.

However, as seen from the above description, if a CDMA receiver is to support N users, then finding N weights requires N calculations for correlation matrices $\Phi 1$ through $\Phi N$, N calculations for inverse matrices $\Phi 1^{-1}$ through $\Phi N^{-1}$ of correlation matrices, N calculations for response vectors U1 through UN and N syntheses of weight vectors W1 through WN, making a total of 4N calculations. Especially, finding a correlation matrix $\Phi i$ and finding an inverse matrix $\Phi i^{-1}$ each requires a large amount of calculations, accordingly needs a large circuit and a plenty of electric power. This is a serious obstacle to introduction of the adaptive array antenna to mobile communications. Further, if the CDMA receiver is a RAKE receiver that uses a plurality of (e.g., K) radio paths and, for this, executes a weight vector calculation for each of the K radio path, then the overall weight vector calculation requires 4N·K calculations, which requires a larger circuit and more electric power.

Also, since the propagation path can always vary in mobile communications, a CDMA receiver needs a control of tracking the variation. However, the LMS algorithm is disadvantageously slow in convergence of weight vectors W1 through WN, failing to track variations in the propagation path.

Therefore, it is an object of the invention to provide an antenna signal processing system for use in an adaptive array antenna-based CDMA receiver which system can find the weight vectors with a reduced amount of calculations. The CDMA receiver may be a RAKE receiver.

It is another object of the invention to provide an antenna signal processing system for use in an adaptive array antenna-based CDMA receiver which system is fast enough in convergence of weight vectors to track the variations in the propagation path.

It is further object of the invention to provide a CDMA receiver provided with an adaptive array antenna and such an antenna signal processing system.

SUMMARY OF THE INVENTION

The above and other objects are achieved by a technique of extracting a channel signal transmitted from each of a first plurality of users or mobile stations from reception signals derived from a second plurality of antennas constituting an antenna array in a CDMA receiver. It is assumed that the reception signals have not yet passed through respective matched filters configured to match a spreading code of each user.

According to an aspect of the invention, at least a common correlation matrix is calculated by using the reception signals. Preferably, the inverse matrix of the common correlation matrix is also calculated. The common correlation matrix or the inverse matrix is used in common to the weight calculations for all the users. An inventive CDMA receiver includes a portion provided for each user, i.e., adaptive array signal processors. Each adaptive array signal processor passes the reception signals through the respective matched filters to obtain respective despread signals; calculates a weight vector by using the common correlation matrix or the inverse matrix thereof; weighs the respective despread signals with the weight vector to obtain weighed despread signals; and combines the weighed despread signals into the channel signal associated with each user.

Since a common correlation matrix and the inverse matrix thereof are calculated only once and used in common to the weight calculations for all the users, the amount of calculations involved in the weight calculations is much reduced.

Further, calculating the correlation matrix in an upstream path of the matched filters 111 enables the period of correlation matrix calculations to be set to any desired value such as the symbol period, the chip time (or the code period), etc. The shorter the calculation period is, the shorter the time necessary for weight convergence becomes.

Also, if a long code is used as the spreading code, a noise-reduced output signal is obtained.

The invention is also applicable to a RAKE receiver. Similarly, the common correlation matrix and the inverse matrix thereof are calculated only once and used in common to all of the users and to the propagation paths of a transmission signal from each users. The RAKE receiver includes first portions provided for respective users. Each of the first portions passes the reception signals through respective matched filters to obtain respective despread signals. Each of the first portions includes second portions provided for the propagation paths of a transmission signal from the user. Each of the second portions calculates a weight vector adapted to one of the propagation paths by using the common correlation matrix or the inverse matrix thereof; weighs the respective despread signals with the weight vector to obtain weighed despread signals; and combines the weighed despread signals into a channel signal component that has passed through the propagation path. Then, the channel signal components are combined together into the channel signal.

This embodiment enables a further reduction of the calculation amount.

According to a second illustrative embodiment, a conversion matrix is calculated from said reception signals; and the reception signals are converted by using the conversion matrix to obtain respective converted signals. A portion provide for each user passes the respective converted signals through respective matched filters configured to match a spreading code of each user to obtain respective despread signals; and maximum-ratio combines the respective despread signals into the channel signal associated with each user.

BRIEF DESCRIPTION OF THE DRAWING

Further objects and advantages of the present invention will be apparent from the following description of the preferred embodiments of the invention as illustrated in the accompanying drawing, in which.

Throughout the drawing, the same elements when shown in more than one figure are designated by the same reference numerals.

DETAILED DESCRIPTION OF THE PREFERRED EMBODIMENTS

Embodiment I

Figure 1:
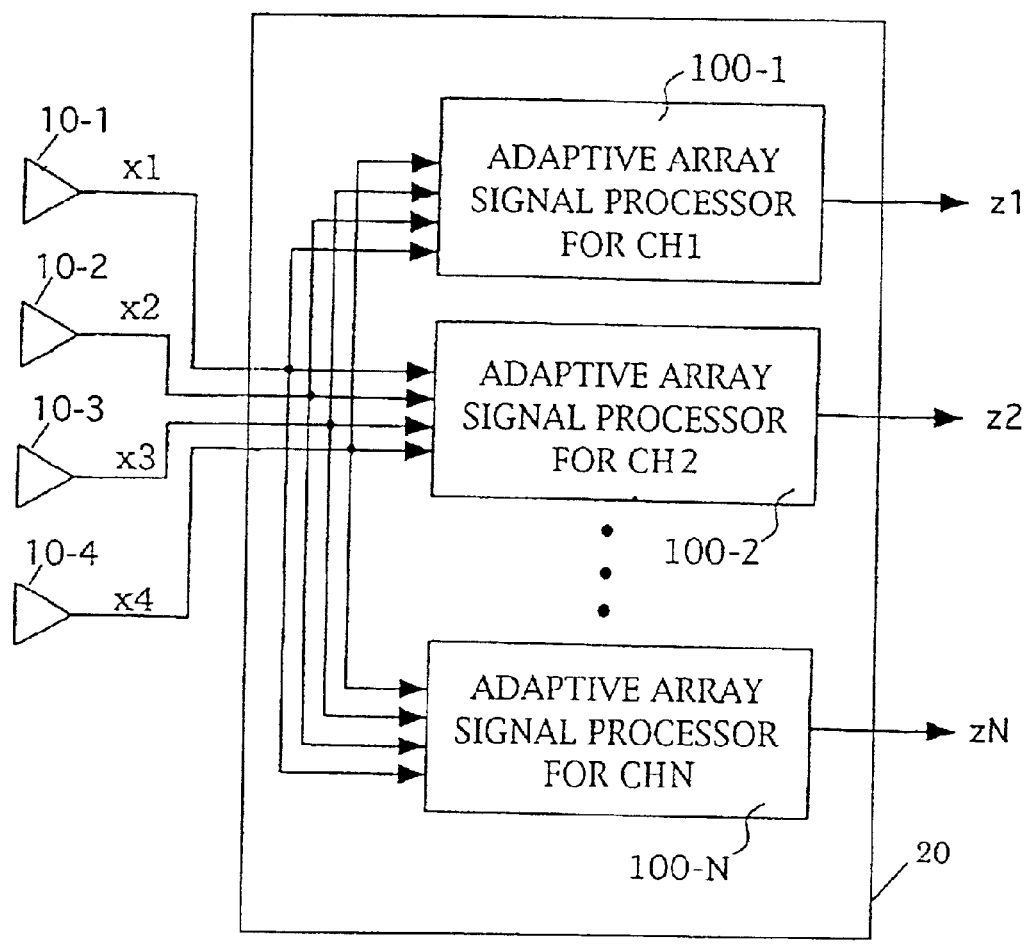
FIG. 1 is a block diagram showing a structure of a conventional adaptive array antenna portion in a multi-user CDMA receiver (not shown)
Figure 3:
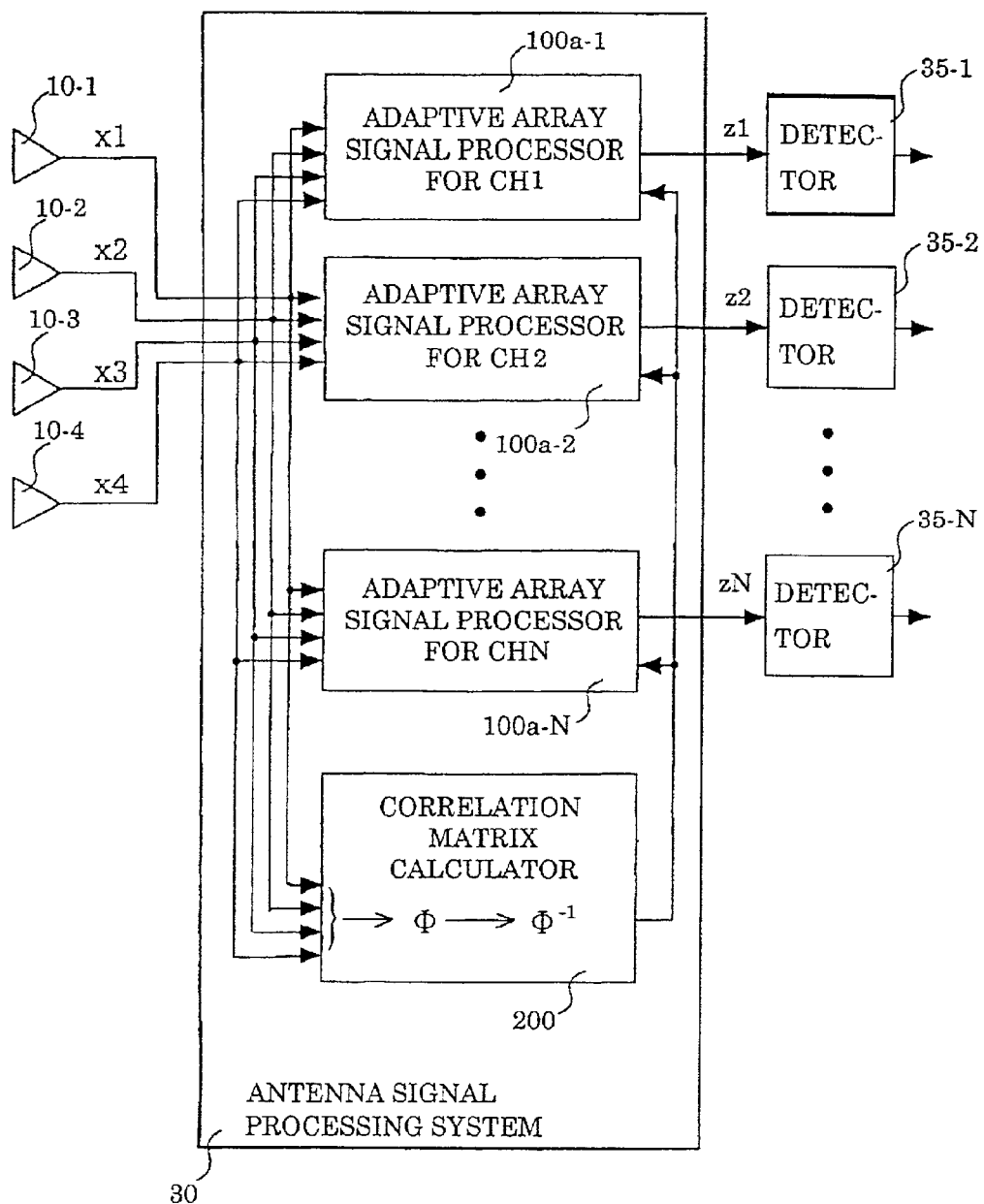
FIG. 3 is a schematic block diagram showing an arrangement of a multi-user CDMA receiver in accordance with a first illustrative embodiment of the invention.

FIG. 3 is a schematic block diagram showing an arrangement of a multi-user CDMA receiver 2 using an adaptive array antenna (not shown) in accordance with a first illustrative embodiment of the invention. In FIG. 3, the adaptive array antenna portion 2 comprises M radio portions 10-1 through 10-M which each include an antenna (not shown) constituting an antennal array (not shown); an antenna signal procession system 30; and M detectors 35-1 through 35-M. M is the number of antennas (not shown) of the not-shown antenna array. It is noted that the antenna signal processing system 30 of FIG. 3 is identical to that 20 of FIG. 1 except that, in FIG. 3, each adaptive array signal processor 100-i has been replaced with a corresponding adaptive array signal processor 100a-i, and a correlation matrix calculator 200 shared by the M adaptive array signal processors 100a has been added. The radio portion 10 output signals x1 through xM (M=4 in this specific example) are coupled with the input terminals of the correlation matrix calculator 200, which has its output supplied to each of the adaptive array signal processors 100a-1 through 100a-N. The output signal zi of each adaptive array signal processor 100-i is supplied to a corresponding detector 35-i, which detects transmitted data from i-th user.

Figure 4:
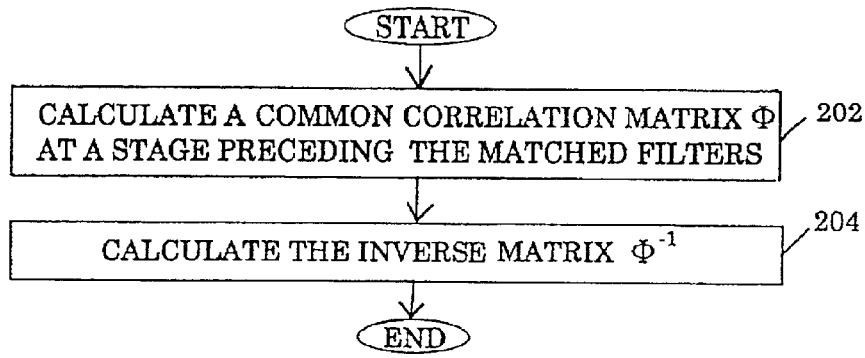
FIG. 4 is a flowchart showing an operation of the correlation matrix calculator 200 of FIG. 3.

FIG. 4 is a flowchart showing an operation of the correlation matrix calculator 200. In According to the principles of the invention, a correlation matrix $\Phi$ common to all of the users or mobile stations is calculated from the output signals x1 through x4 of the radio portions 10-1 through 10-M. Specifically, the correlation matrix calculator 200 calculates a common correlation matrix $\Phi$ from the signals x1 through x4 to be input to the respective adaptive array signal processors 100a-1 through 100a-N as shown in step 202. In this case, the common correlation $\Phi$ matrix is expressed as follows:

$$\Phi = E\left\{\begin{bmatrix} X_1X_1^* & X_1X_2^* & X_1X_3^* & X_1X_4^* \\ X_2X_1^* & X_2X_2^* & X_2X_3^* & X_2X_4^* \\ X_3X_1^* & X_3X_2^* & X_3X_3^* & X_3X_4^* \\ X_4X_1^* & X_4X_2^* & X_4X_3^* & X_4X_4^* \end{bmatrix}\right\}, \quad (6)$$

where A* is a complex conjugate to A, and E{B} indicates a mean of matrices B for a lot of data samples. Thus, each element of the common correlation matrix $\Phi$ is an average, taken for a certain period of time, of the correlation between a pair (including duplication of a single signal) from the signals x1 through x4 from the antennas (not shown) or the radio portions 10-1 through 10-4.

Usually, the signals received by the antenna are subjected to sampling before being converted into respective baseband signals. In the CDMA system, the baseband reception signals have been sampled at an interval equal to or shorter than the update interval Tc of the spreading code. In this embodiment, the averaging of the correlation values may be carried out for the radio portion 10 output signals x1 through x4 for every period Tc in the calculation of the common correlation matrix $\Phi$. The averaging may be done at a longer interval; e.g., every symbol period Td of the transmission data. Also, the averaging of the correlation values may be done at irregular intervals. For the sake of the simplicity, it is assumed that the radio portion 10 output signals are detected every symbol period Td for the correlation matrix calculation.

Following the correlation matrix calculation, the correlation matrix calculator 200 calculates the inverse matrix $\Phi^{-1}$ of the common correlation matrix Φ in step 204. The value of the calculated inverse matrix $\Phi^{-1}$ is supplied to each of the adaptive array signal processors 100a-1 through 100a-N.

Figure 5:
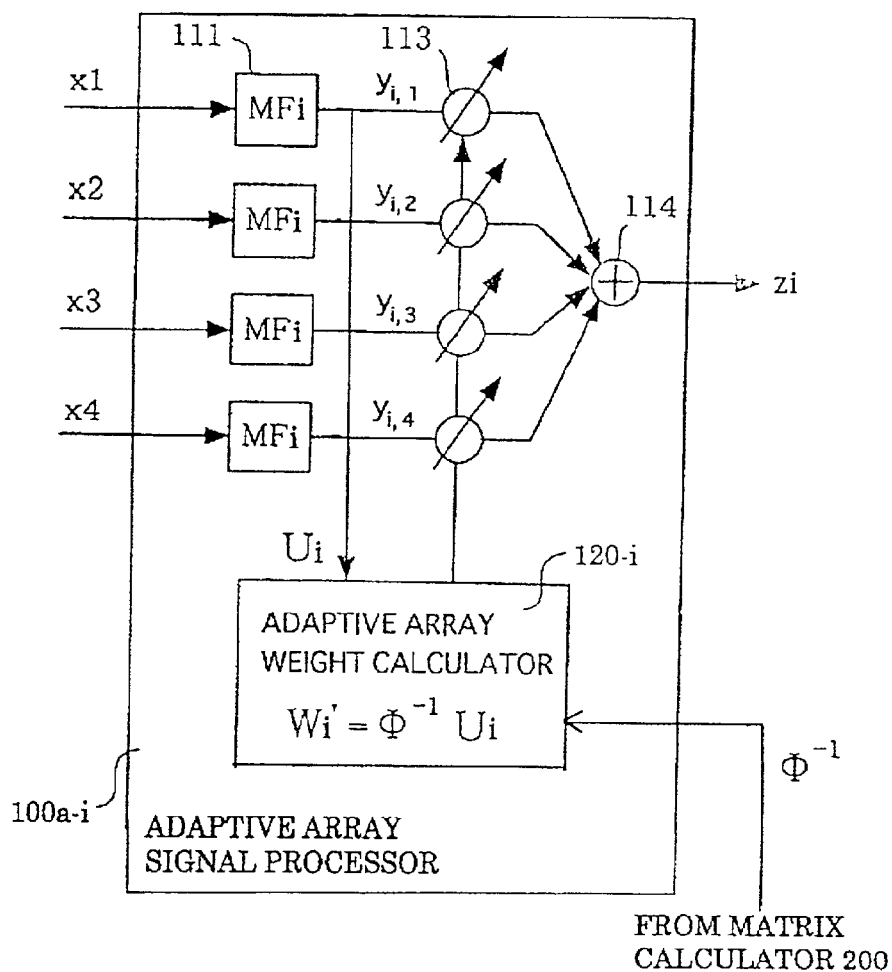
FIG. 5 is a schematic block diagram showing an arrangement of the adaptive array signal processor 100a-i of FIG. 3.
Figure 6:
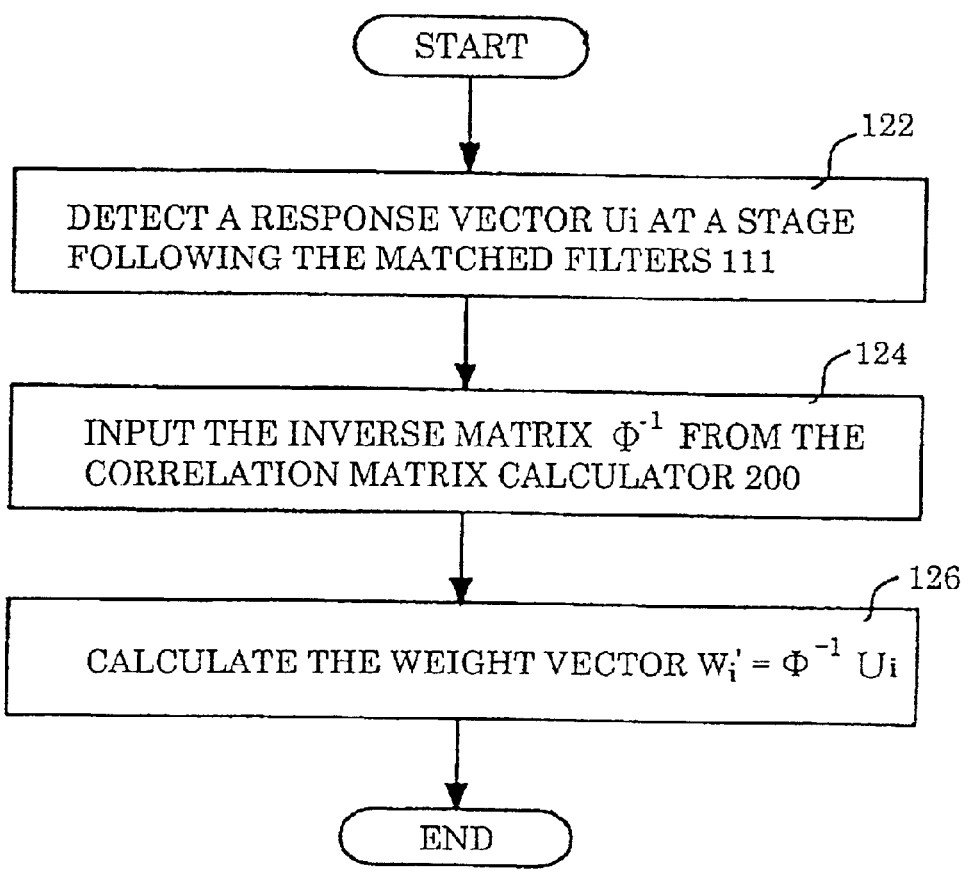
FIG. 6 is a flowchart showing an exemplary operation of the adaptive array weight calculator 120-i of FIG. 5.

FIG. 5 a schematic block diagram showing an arrangement of the adaptive array signal processor 100a-i of FIG. 3. The adaptive array signal processor 100a-i of FIG. 5 is identical to that 100-i of FIG. 2 except that in FIG. 5, the adaptive array weight calculator 112-i has been replaced with an adaptive array weight calculator 120-i. The operation of the adaptive array weight calculator 120-i is shown in FIG. 6. In FIG. 6, the weight calculator 120-i detects a response vector Ui by using the reference code included in the despread output $y_{i,1}$ through $Y_{i,4}$ from the respective matched filters 111 in step 122. Then, the weight calculator 120-i inputs the inverse matrix $\Phi^{-1}$ in step 124, and calculates, in step 126, the weight vector Wi' according to the following equation:

$$Wi' = \Phi^{-1} \cdot Ui. \quad (7)$$

Figure 2:
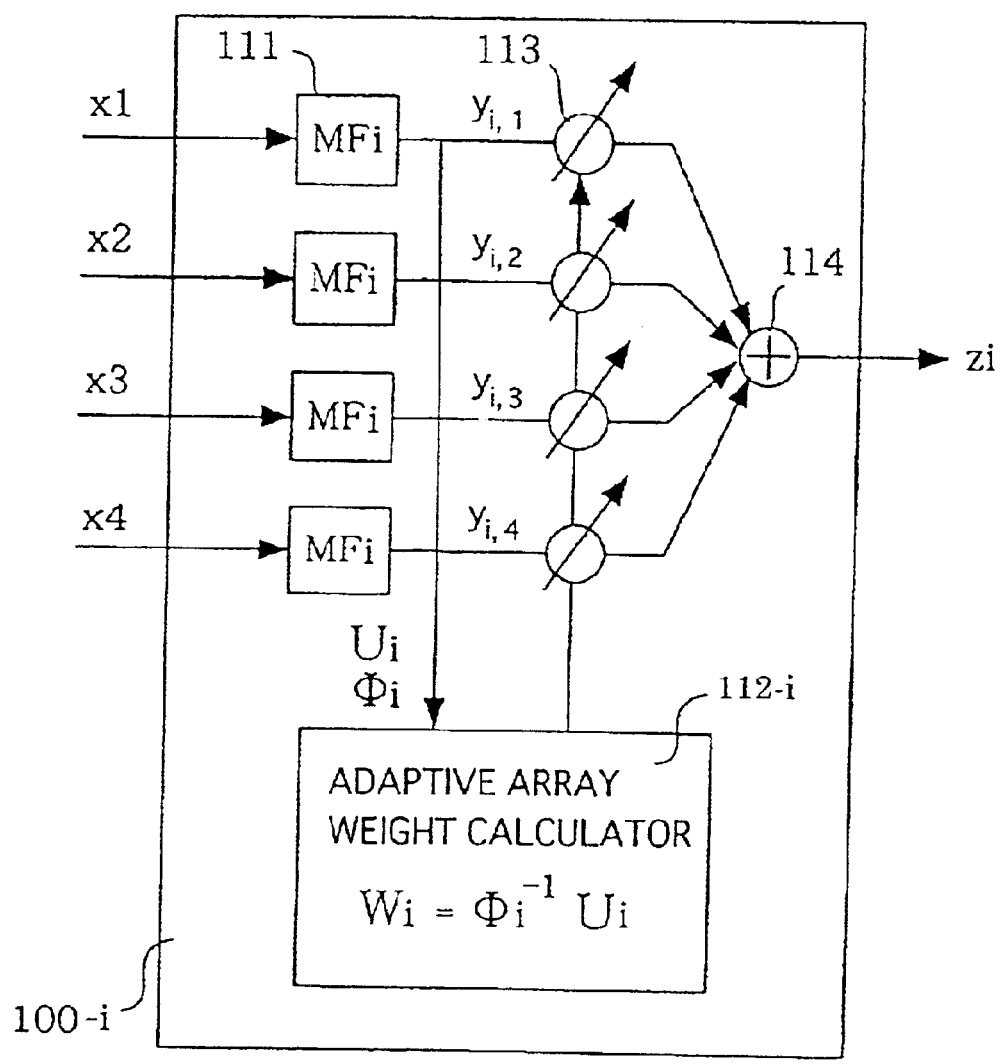
FIG. 2 is a block diagram showing a structure of each adaptive array signal processor 100-i of FIG. 1.

Since the remaining portions are identical to corresponding portion of FIG. 2, the operation of the remaining portions are identical to that of the corresponding portion of FIG. 2.

As seen from the above description, the present embodiment calculates only the common correlation matrix Φ and the inverse matrix $\Phi^{-1}$ thereof, whereas the prior art system calculates the N correlation matrices Φ1 through ΦN and the N inverse matrices $\Phi^{-1}$ thereof. Thus, the present embodiment enables a large reduction in the amount of calculation.

Also, it is noted that the weight vectors Wi' (i=1, 2, ..., N) calculated in accordance with the first illustrative embodiment is not equal to the weight vectors Wi calculated in a prior art system. However, the difference between the vectors Wi' and Wi are generally very small. We discuss the properties of the weight vector in the following.

It is assumed that a reception signal of each user obtained from the M antennas is expressed by a reception signal vector:

$$Vi = (V_{i,1}, V_{i,2}, \ldots, V_{i,M}),$$

where $V_{i,j}$ indicates the level of a reception signal of a user i which is obtained from an antenna j and which does not include the carrier component. Then, it is well known in the art that the correlation matrix Φ is given by:

$$\Phi = \sum_{i=1}^{N} V_i \cdot V_i^H, \quad (9)$$

where $A^H$ is a transposed conjugate of the matrix A.

On the other hand, in the prior art, the correlation matrices Φ1 through ΦN are calculated for the signals that have passed through the matched filters 111. For example, the correlation matrix Φi calculated for the signals of user 1 that have passed through the matched filters 111 is express as:

$$\Phi 1 = \sum_{i=1}^{N} |a_i|^2 V_i \cdot V_i^H, \quad (10)$$

where $a_i$ indicates the correlation between a spreading code of user 1 and a spreading code of user i and is expressed as:

$$a_i = E\{c_1(t) \cdot c_i(t)\}, \quad (11)$$

where $E\{A\}$ is an average of A during the same period of time as the averaging period in the correlation matrix calculation. In the CDMA, though the correlation $a_i$ (i≧2) between the spreading code of user 1 and the spreading code of other user i slightly vary depending on user i, the correlations $a_2$ through $a_N$ are substantially identical to each other. For example, in the W-CDMA the introduction of which is under examination in Japan, it is under consideration whether to use, as the spreading codes of the users, long codes the period of which is very long. If such codes are used, then the spreading code $c_i(t)$ of each user has a sufficient randomness, causing the time-averaging of E{ } to equalize the correlations of the users to each other.

If the correlations of the spreading codes between user 1 and other user i (i–1) are perfectly identical to each other, then the weight vectors Wi and Wi' are expressed as follows:

$$Wi = \left(\sum_{i=2}^{N} |a_i|^2 V_1 \cdot V_i^H\right)^{-1} U_i = |a_i|^2 \left(\sum_{i=2}^{N} V_i \cdot V_i^H\right)^{-1} U_i \quad (12)$$

$$Wi' = \left(\sum_{i=2}^{N} V_i \cdot V_i^H\right)^{-1} U_i \quad (13)$$

It is noted that since a desired signal component (i=1) has no influence on the value of the weight in the correlation matrix in the expression (12) and (13), the notation for i=1 has been omitted. As seen from expression (12) and (13), the weight vectors Wi and Wi' are only different in the scalar and share an identical direction. In weight operation, the scalar of the weight is meaningless, what is important is one the direction of the weight. For this reason, the weight vectors Wi and Wi' can be considered to be equivalent to each other.

That is, if the spreading code correlations $a_2$ through $a_N$ among N different users are perfectly identical to each other, then the weight vector Wi' is equivalent to Wi. Also, if the spreading code correlations $a_2$ through $a_N$ vary depending on the user, then the weight vector Wi' does not match the weight vector Wi but has a value close to Wi. Though we have made the above discussion in conjunction with a case of the desired signal being a signal from user 1, the above described properties are also true to the other users.

As described above, the weight vector for each user calculated in accordance with the present invention has a value vary close to that of prior art adaptive array antenna. Accordingly, the present invention can realize an adaptive array antenna system of a substantially optimal state with a reduced amount of calculations.

Also, if a long code the period of which is vary long is used for the spreading codes for the users, then calculating the correlation matrix in a stage preceding the matched filters as is done in the present invention makes the convergence of calculations fast as compared with calculating the correlation matrix for the signals that have been passed through the matched filters and reduces errors in calculation. That is, the output of each matched filter 111 includes mutual correlations with other users as interference components. If a long code is used, then the level of the mutual correlations changes depending on the symbol. For this reason, calculating the correlation matrices Φ1 through ΦN by using the output signals of the matched filters 111 causes the convergence time in the correlation matrix calculation to become long. On the other hand, if the calculation of the correlation matrix is executed at a stage preceding the matched filters 111 in accordance with the present invention, then since no mutual correlation occurs, the level of the interference signals can be regarded as a constant during a process period, causing the correlation matrix Φ to converge fast and reducing errors.

Further, the correlation matrices calculated in a downstream path of the matched filters 111 includes a large magnitude of the desired signal component, which has no effect on the weight vector when the weight vector has complete converged or has reached a stationary state but may cause an error in the weight vector if the weight vector has not yet converged. On the other hand, the correlation matrix Φ found in accordance with the invention includes a less magnitude of the desired signal component, which hardly causes an error in the weight vector.

It should be noted that calculating the correlation matrix Φ in an upstream path of the matched filters 111 enables the period of correlation matrix calculation to be set to any desired value such as the symbol period, the chip time (or the code period), etc.

To sum up, an antenna signal processing system 30, an adaptive array antenna portion 2 of a multi-user CDMA receiver according to the present invention not only reduces the amount of calculations in the weight vector calculation but also exhibits desirable output signal characteristics if a long code is used, and also enables the correlation matrix to be calculated in a desired period.

In this specific embodiment, the response vector Ui is calculated on the basis of the reference signals included in the outputs of the matched filters 111 in each adaptive array weight calculator 120-i. However, in a user data transmission period other than reference signal transmission period, the signals output from the matched filters 111 may be detected and the detected signals may be used as the reference signals to obtain the response vector.

The adaptive array weight calculator 120-i may be so configured as to perform a signal processing by treating, as zero, some of the elements of the response vector if the values thereof are sufficiently small.

The same weight as that of the prior art Equal Gain Combining or Selection Combining may be used as the response vector.

As seen from above, the response vector Ui has not necessarily to be in the form as described in the above-described illustrative embodiment.

A RAKE Receiver according to Embodiment I

Figure 7:
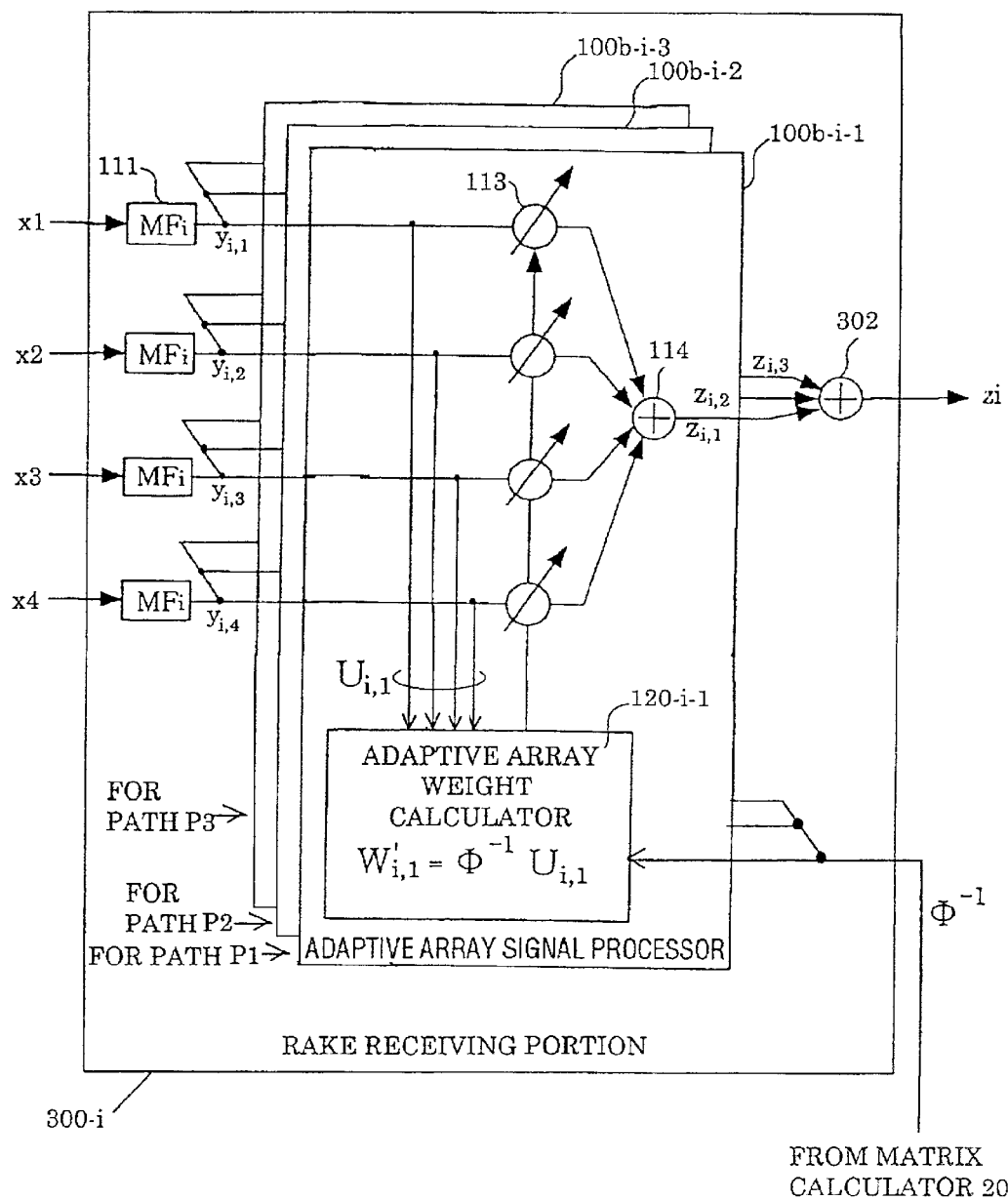
FIG. 7 is a schematic block diagram showing an arrangement of a RAKE receiving portion 300-i which, when substituted for the adaptive array signal processor 100a-i, enables the antenna signal processing system 30 to realize a RAKE reception.

FIG. 7 is a schematic block diagram showing an arrangement of a RAKE receiving portion 300-i which, when substituted for the adaptive array signal processor 100a-i in FIG. 3, enables the antenna signal processing system 30 to realize a RAKE reception. In FIG. 7, the RAKE receiving portion 300-i associated with user (or mobile station) i comprises M matched filters 111 each configured to match the spreading code of user i; a plurality of (P) adaptive array signal processors 100b-i-1 through 100b-i-P (P is the number of signals to be extracted which signals have propagated through different radio paths); and a signal combiner 302 for combining the output signals $z_{i,1}$ through $z_{i,P}$ from the P adaptive array signal processors 100b-i to provide a combined signal zi. The number of propagation path-different signal to be received, P, may be set to any suitable integer larger than one. In this specific example, P is set to three. The signals that have passed through the matched filters 111 are supplied to each of the three adaptive array signal processors 100b-i-1 through 100b-i-3. Each adaptive array signal processor 100b of FIG. 7 is identical to that 100a of FIG. 5 expect that the matched filters 111 have been removed, yet the outputs of the matched filters 111 are connected to the adaptive array weight calculator 120-i input terminals and to the input terminals of respective multipliers 113.

The adaptive array signal processors 100b are identical to each other in structure. In a RAKE receiver (not shown) or antenna signal processing system 30 incorporating this RAKE receiving portions 300, the inverse matrix $\Phi^{-1}$ of a common correlation matrix Φ is used for each RAKE receiving portion 300-i that uses delay taps and for each adaptive array signal processor 100b-i-p (p=1, 2, 3 in this specific example). A response vector Ui,p is calculated for a corresponding delay tap in each adaptive array weight calculator 120-i-p of each RAKE receiving portion 300-i.

According to the present invention, an antenna signal processing system 30 or an adaptive array antenna portion 2 incorporating the RAKE receiving portions 300 only requires the calculation of a common correlation matrix and a inverse matrix calculation. Considering that prior art RAKE receivers require N·P calculations of correlation matrices and N·P inverse matrix calculations, it is clear that an antenna signal processing system 30 or an adaptive array antenna portion 2 incorporating the RAKE receiving portions 300 enables a large reduction in the amount of calculations involved in the weight vector calculation.

Though we discussed a multi-user case in the above example, the invention is also applicable to a single user RAKE receiver.

It should be noted that using an above-mentioned long code for the spreading code enables an inventive RAKE receiver to have desirable output signal characteristics as described above.

Embodiment II

Figure 8:
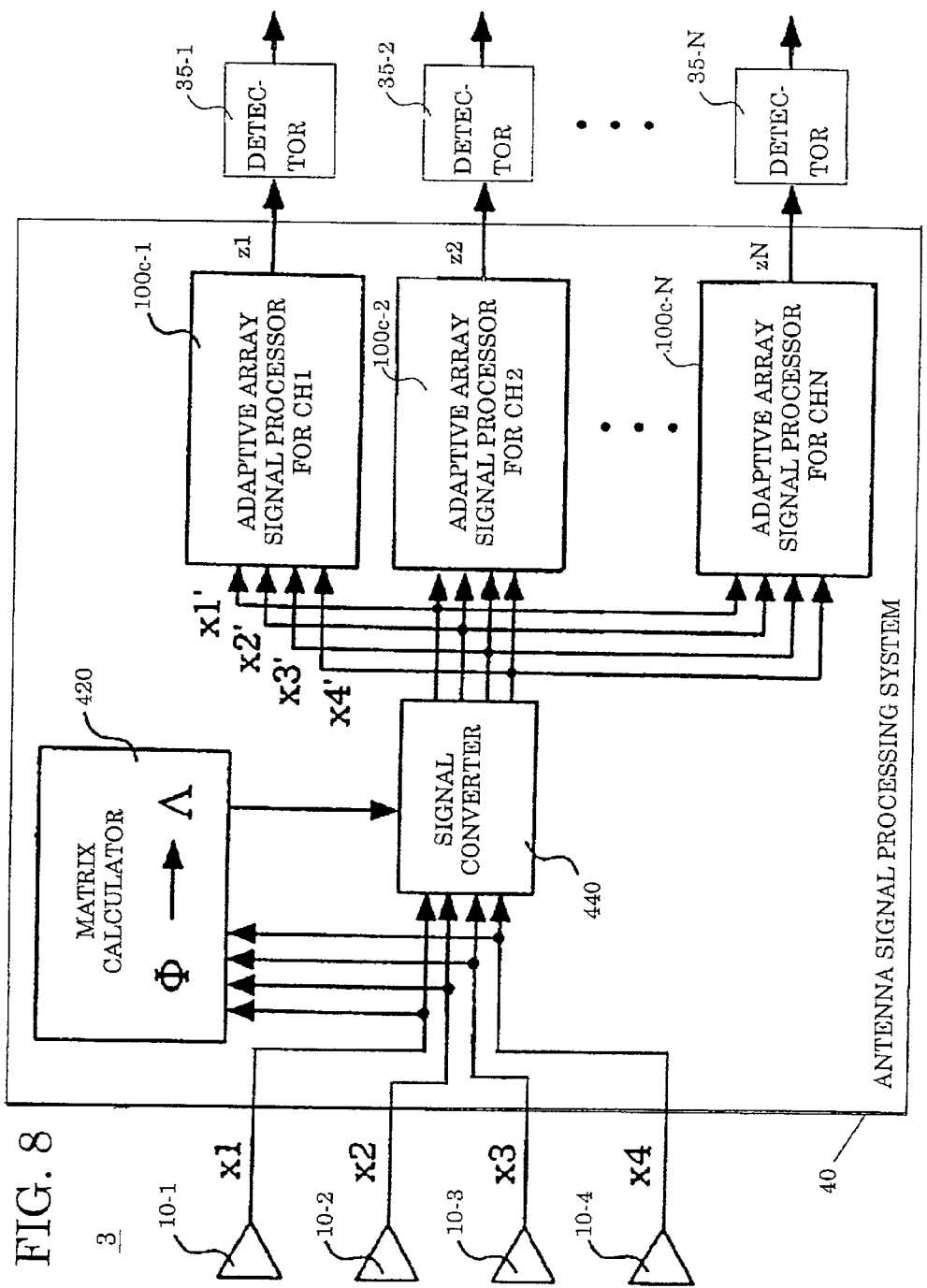
FIG. 8 is a schematic block diagram showing an arrangement of a multi-user CDMA receiver in accordance with a second illustrative embodiment of the invention.

FIG. 8 is a schematic block diagram showing an arrangement of a multi-user CDMA receiver in accordance with a second illustrative embodiment of the invention. In FIG. 8, the multi-user CDMA receiver 3 is identical to that 2 of FIG. 3 except that the antennal signal processing system has been changed from 30 to 40. The antennal signal processing system 40 of FIG. 8 is identical to that 30 of FIG. 3 except that in FIG. 8:

the matrix calculator has been changed from 200 to 420;

a signal converter 440 has been inserted in the output signal (x1 through x4) path from the radio portions 10 on the downstream side of the input points of the matrix calculator 420;

the output of the matrix calculator 420 has been connected to the signal converter 440; and the adaptive array signal processors have been changed from 100a to 100c.

Figure 9:
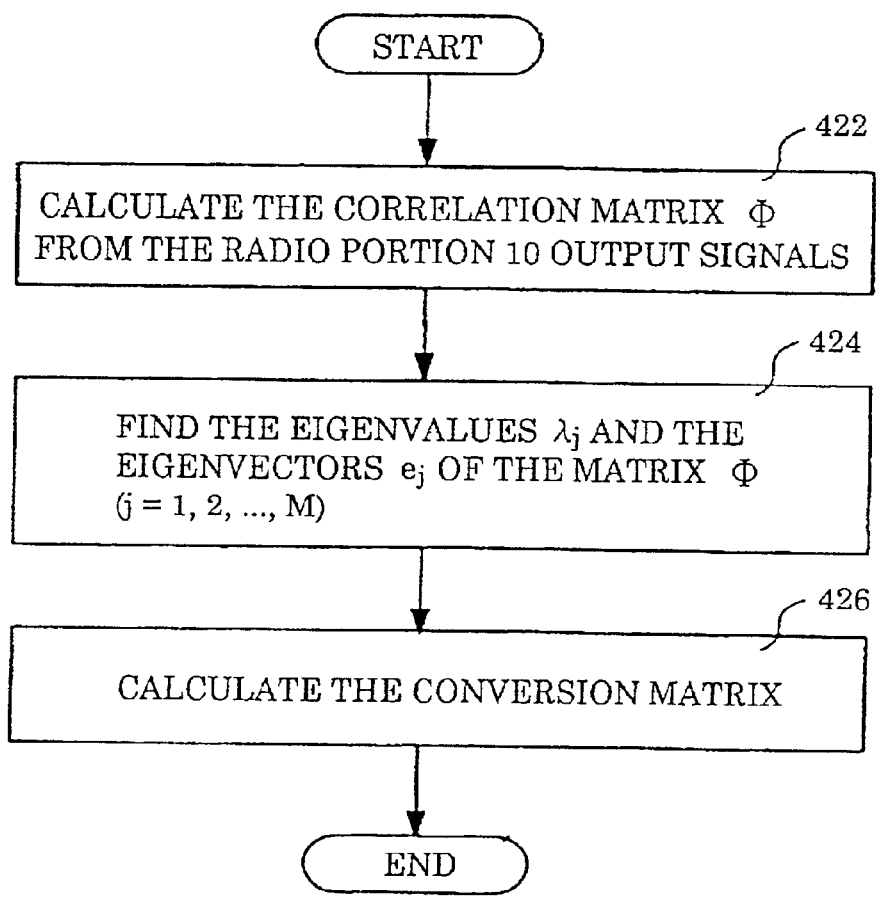
FIG. 9 is a flowchart showing an exemplary operation of the matrix calculator 420 of FIG. 8.

FIG. 9 is a flowchart showing an exemplary operation of the matrix calculator 420 of FIG. 8. In FIG. 9, the matrix calculator 420 first calculates the common correlation matrix Φ by using the radio portion 10 output signals x1 through x4 in the same manner as described in the first embodiment in step 422. In step 424, the matrix calculator 420 performs an eigen-analysis of the correlation matrix Φ to find eigenvalues $\{\lambda_j | j=1, 2, \ldots, M\}$ and eigenvectors $\{e_j | j=1, 2, \ldots, M\}$. A numeral M is the number of antennas. Then, in step 426, the matrix calculator 420 calculates a conversion matrix Λ as follows:

$$\Lambda = \left[ \frac{e_1}{\sqrt{\lambda_1}} \quad \frac{e_2}{\sqrt{\lambda_2}} \quad \cdots \quad \frac{e_M}{\sqrt{\lambda_M}} \right]^T. \tag{14}$$

Using thus obtained conversion matrix Λ, the signal converter 440 converts the complex baseband signals x1 through xM output from the radio portions 10 as follows:

$$[x1' \; x2' \ldots xM']^T = \Lambda^H [x1 \; x2 \ldots xM]^T, \tag{15}$$

where [x1 x2 ... xM] indicates the input complex baseband signals, [x1' x2' ... xM'] indicates the converted signals, $[A]^T$ indicates the transposed matrix of A. This conversion is conducted every sampling period of the baseband signal. The converted signals x1', x2', ..., xM' are supplied to each of the adaptive array signal processor 100c-1 through 100c-N associated with respective users 1 through N.

Figure 10:
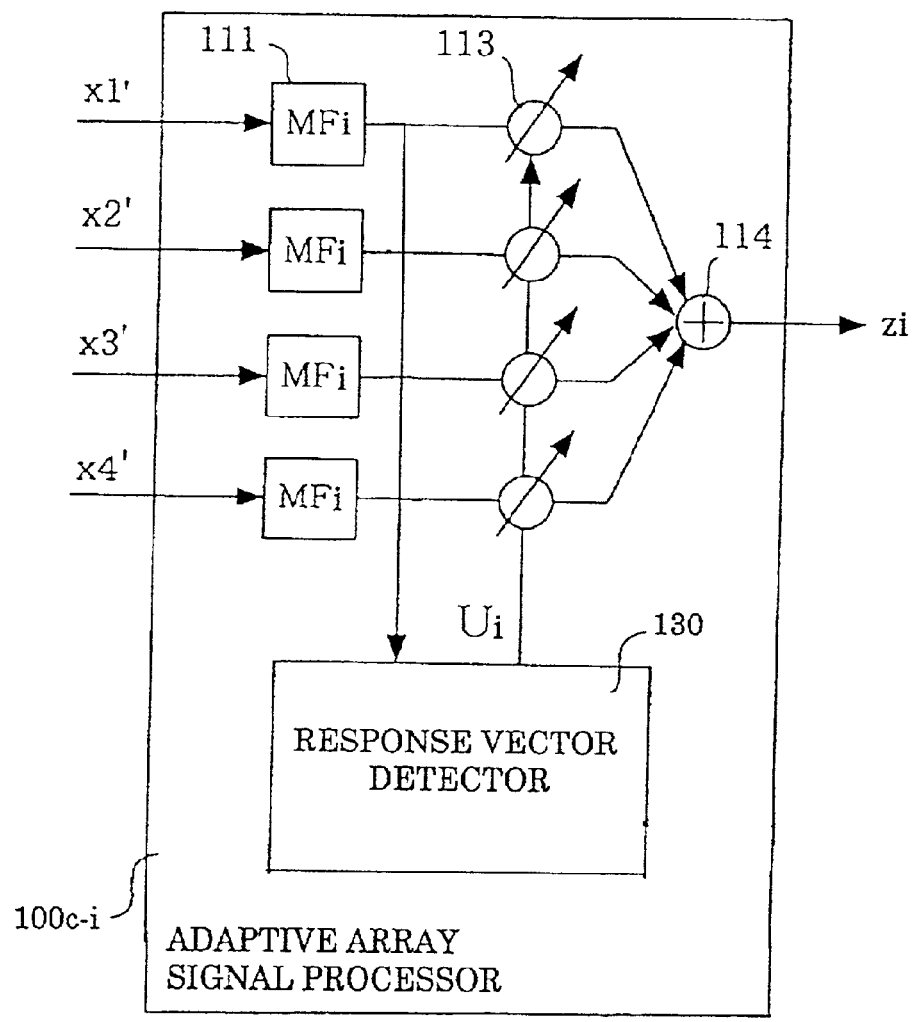
FIG. 10 is a schematic block diagram showing an arrangement of the adaptive array signal processor 100c-i of FIG. 8.

FIG. 10 is a schematic block diagram showing an arrangement of an adaptive array signal processor 100c-i of FIG. 8. The adaptive array signal processor 100c-i of FIG. 8 is identical to that 100a-i of FIG. 5 except that in FIG. 10, the adaptive array weight calculator 120-i has been replaced with a response vector detector 130. For this reason, the description of the same elements is omitted.

The response vector detector 130 obtains a response vector Ui by using a reference signal inserted in each of the despread signals from the matched filters 111 and outputs the obtained response vector Ui as the weight vector Wi. The weight-multipliers 113 multiplies the respective despread signals by the response vector Ui. The weight-multiplied despread signals are combined by the combiner 114. In this way, an adaptive array signal processor 100c-i associated with user i detects its own signals with the matched filters 111 and performs a maximum-ratio combining of the detected signals.

We discuss some properties of a combined signal output zi obtained in accordance with the second illustrative embodiment of the invention in the following. It is first assumed that the reception signals for user i is expressed as a vector:

$$Vi \cdot s(t) = [V_{i,1}, V_{i,2}, V_{i,M}] \cdot s(t), \quad (16)$$

where $[V_{i,1}, V_{i,2}, \ldots, V_{i,M}]$ is the levels of the reception signals that include no modulation signal, and s(t) is the modulation component of the reception signals. Then, the output of the signal converter 440 is given by $\Lambda^H \cdot Vi \cdot s(t)$. Also, the response vector Ui obtained in the response vector detector 130 is expressed as:

$$Ui = \beta \cdot \Lambda^H \cdot Vi, \quad (17)$$

where $\beta$ is a constant.

Thus, the combined signal zi for user i is given by:

$$zi = U_i^H \cdot \Lambda^H \cdot Vi \cdot s(t) \quad (18)$$
$$= (\beta \Lambda^H \cdot Vi)^H (\Lambda^H \cdot Vi \cdot s(t))$$
$$= \beta (\Lambda \cdot \Lambda^H \cdot Vi)^H \cdot Vi \cdot s(t)),$$

where $\Lambda^H$ is a transposed conjugate of $\Lambda$.

As seen from expression (18), the equivalent weight for user i is expressed as $\Lambda \cdot \Lambda^H \cdot Vi$. It is well known in the art that the following relationship exists between the conversion matrix $\Lambda$ and the correlation matrix $\Phi$. That is, $$\Lambda \cdot \Lambda^H = \Phi^{-1}. \quad (19)$$

Thus, the equivalent weight vector is expressed by $\Phi^{-1} \cdot Vi$, which is the same as the weight vector Wi used in the first embodiment. In sum, the second embodiment of the invention differs in configuration from the first embodiment but provides the combined signal output as that of the first embodiment.

Since the signal converter 440 is shared by all of the users, the converter 440 is effective to any change in the number of the users.

It should be noted that the antenna signal processing system 40 is completely separated into a signal conversion portion (420 and 440) that uses a common correlation matrix and a signal combining portion 100a based on the maximum-ratio combining. In this sense, the second embodiment of the invention is very advantageous if a currently used maximum-ratio combining receiver is to be changed to an adaptive array antenna receiver. That is, a adaptive array antenna receiver can be realized by inserting the conversion matrix calculator 420 and the signal converter 440 in the upstream path of a conventional signal combiner.

Thus, the second embodiment of the invention can be realized by using a conventional receiver.

A RAKE Receiver According to Embodiment II

A RAKE Receiver according to the second embodiment of the invention can be realized by using the RAKE receiving portions 300 of FIG. 7 for the adaptive array signal processors 100c in FIG. 8.

According the second illustrative embodiment of the invention, a conventional RAKE receiving and maximum-ratio combining receiver can be changed to a adaptive array antenna receiver by adding the conversion matrix calculator 420 and the signal converter 440. A conversion matrix calculator 420 and a signal converter 440 are shared by all of the users and the delay taps, thereby enabling the adaptive array reception with a reduced amount of calculations.

However, as is well-known in the art, if the level of eigenvalues $\lambda j$ is close to that of noises, then the output of the signal converter 440 mostly contains noises but hardly includes signal components. What is needed is to reduce the amount of calculations with the noise level suppressed. This is achieved by the following modification of this embodiment.

Modification

According to this modification, if any eigenvalue(s) exist (s) that is (or are) lower in level than a predetermined value, then the signal(s) converted with the low-level eigenvalue(s) and corresponding eigenvector(s) is (or are) not used for the subsequent process. Specifically, if the level of eigenvalue $\lambda_2$ is as low as the noise level, then the signal converter 440 outputs a conversion matrix $\Lambda'$ without the element using eigenva$\lambda_2$ as follows:

$$\Lambda' = \left[ \frac{e_1}{\sqrt{\lambda_1}} \quad \frac{e_3}{\sqrt{\lambda_3}} \quad \cdots \quad \frac{e_M}{\sqrt{\lambda_M}} \right]^T. \quad (20)$$

In response to the conversion vector $\Lambda'$, the signal converter 440 performs a signal conversion as follows:

$$[x1' \ x3' \ldots xM']^T = \Lambda'^H [x1 \ x2 \ldots xM]^T, \quad (21)$$

Since the output signals from the signal converter 440 do not include the signal(s) associated with eigenvalue(s) that is (are) judged to be the low level eigenvalue: i.e., the signal associated with $\lambda_2$, in this specific example, the number of signals to be processed by the adaptive array signal processors 100c is equal to or less than M. This contributes to the reduction of the processing load in the adaptive array signal processors 100c.

It should be noted that this weak signal excluding strategy can be used in an upstream path of the matched filters in any adaptive array antenna-based system. Specifically, a test is made to see if a level of a signal applied to each of the matched filters is as low as noises; if so, then it is preferable to prevent the signal(s) so determined from being used in a subsequent stage, e.g., by not passing the signal(s) to the matched filters.

Though the SMI (Sample Matrix Inversion) algorithm has been used in the above-described embodiment, the invention is applicable with the RLS (Recursive Least Squares) algorithm.

Embodiment III

Figure 11:
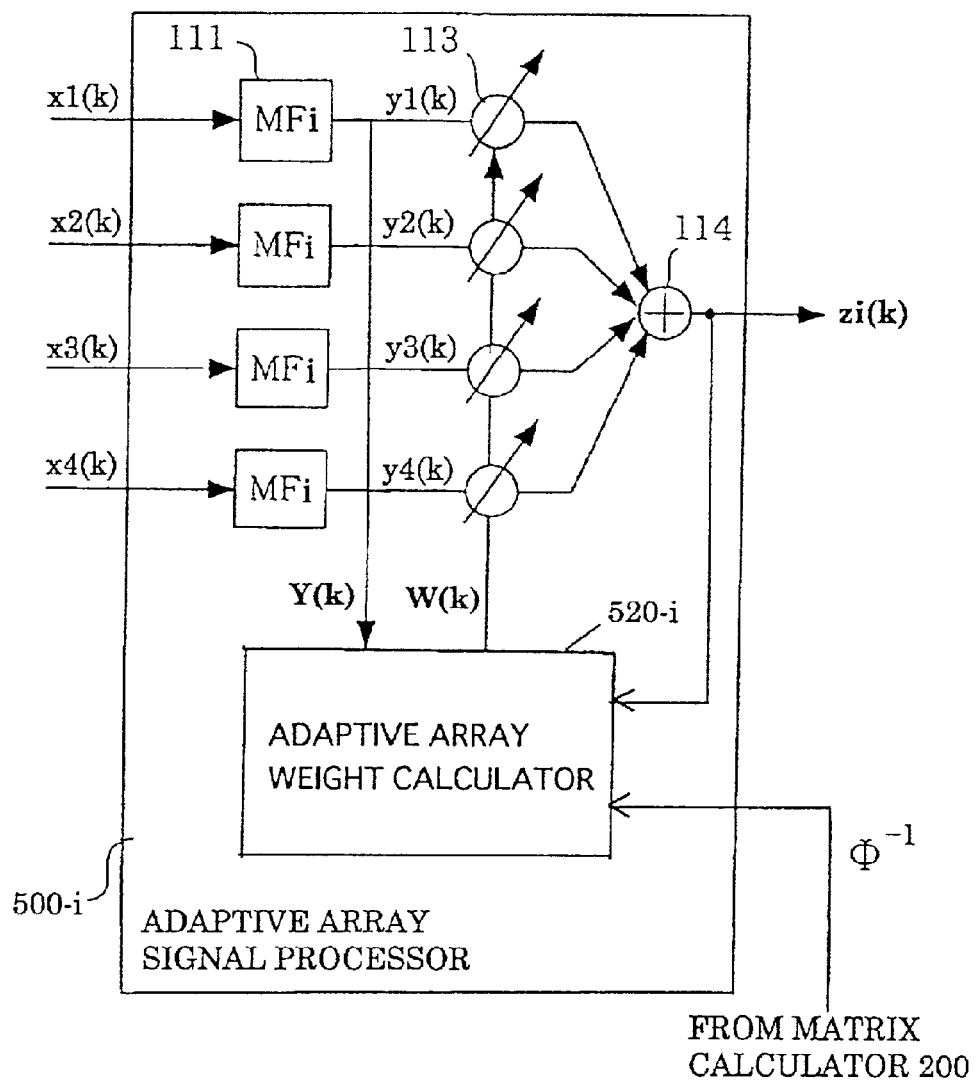
FIG. 11 is a schematic block diagram showing an arrangement of an RLS algorithm-based adaptive array signal processor 500 that can be substituted for the adaptive array signal processor 100a in FIG. 3.

FIG. 11 is a schematic block diagram showing an arrangement of an RLS algorithm-based adaptive array signal processor 500 that can be substituted for the adaptive array signal processor 100a in FIG. 3. In FIG. 11, the RLS algorithm-based adaptive array signal processor 500 is identical to the processor 100a of FIG. 5 except that the adaptive array weight calculator has been changed from 120-i to 520-i and the output of the signal combiner 114 has been fed back to the adaptive array weight calculator 520-i.

In order to facilitate the description and understanding, the signals supplied from the radio portions 10 to the matched filters 111 is expressed as x1(k), x2(k), . . . , xM(k). M is the number of antennas (M=4 in this specific example), and k is a serial number assigned to the incoming symbols. Signals x1(k) through x4(k) passing through the respective matched filters 111 yields, at the filter 111 outputs, signals y1(k) through y4(k), respectively, which is hereinafter denoted en bloc as Y(k).

Then, the adaptive array weight calculator 520-i updates the current weight W(m) according to the following equation by using the despread signal vector Y(k), the inverse matrix $\Phi^{-1}$ from the correlation matrix calculator 200 and the fed-back combined signal zi(k).

$$W(k+1)=W(k)+\gamma\Phi^{-1}\cdot Y(k)\cdot e^*(k), \quad (22)$$

where $$e(k)=r(k)-W(k)^H\cdot Y(k), \quad (23)$$

where r(k) is a vector expression for the current reference signals inserted in the matched filter 111 outputs Y(k).

Though the third embodiment of the invention uses the RLS algorithm, this embodiment has the same advantages as the first embodiment has.

In the just-described specific example, the RLS algorithm or the adaptive array weight calculator 520-i has used the despread signals Y(k). However, the radio portion 10 output signals may be used for the weight calculation as in case of the second embodiment shown in FIG. 8. In this case, the value $\Phi^{-1}\cdot X(k)$ can be used in common to the users, enabling a further reduction in the amount of calculations.

As described above, according to the present invention, an antenna signal processing system 30 or an adaptive array antenna portion 2 incorporating the RAKE receiving portions 300 only requires the calculation of a common correlation matrix and a inverse matrix calculation, enabling a large reduction in the amount of calculations involved in the weight vector calculation.

Using an long code for the spreading code enables an inventive RAKE receiver to have desirable output signal characteristics.

Calculating the correlation matrices in a upstream path of the matched filters causes the desired signal components of the correlation matrices to become low in level, shortening the conversion time in the weight calculation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A CDMA receiver for receiving transmission signals transmitted from a first plurality of users and putting out message signals included in the respective transmission signals, the CDMA receiver comprising:

a second plurality of antennas;

radio portions, fed by respective antennas, for providing reception signals derived from said respective antennas;

matrix calculation means for performing a matrix calculation by using said reception signals to provide at least a common correlation matrix;

adaptive array antenna signal processing portions provided for respective users, each adaptive array antenna signal processing portion being supplied with said reception signals from said radio portions; and detectors, provided for respective users, for detecting said message signals from output signals of said adaptive array antenna signal processing portions, wherein each of said adaptive array antenna signal processing portions comprises:

a second plurality of matched filters, each of said matched filters being configured to match a spreading code of each user to provide a despread signal;

means for calculating a weight vector by using a result of said matrix calculation;

a second plurality of multipliers for weighing said despread signals from said matched filters with respective elements of said weight vector to provide weighed despread signals; and means for combining said weighed despread signals into one of said output signals associated with each user.

2. A CDMA receiver as defined in claim 1, wherein said matrix calculation means includes means for calculating an inverse matrix of said correlation matrix, wherein the CDMA receiver further comprises means for obtaining a response vector by using reference signals inserted in said despread signals, and wherein said means for calculating a weight vector comprises means for calculating said weight vector by using said inverse matrix and said response vector.

3. A CDMA receiver for receiving a transmission signal transmitted from each of at least one user and putting out a message signal included in the transmission signal, the CDMA receiver comprising:

a first plurality of antennas;

radio portions, fed by respective antennas, for providing reception signals derived from said respective antennas;

matrix calculation means for performing a matrix calculation by using said reception signals to provide at least a common correlation matrix;

at least one RAKE receiving portion provided for said at least one user, each RAKE receiving portion being supplied with said reception signals from said radio portions; and one or more detector(s), provided for said at least one user, for detecting said message signal(s) from output signal(s) of said at least one RAKE receiving portion (s), wherein each of said at least one RAKE receiving portion comprises:

matched filters each being supplied with said reception signals from said radio portions and configured to match a spreading code of each user to provide a despread signal;

adaptive array antenna signal processing portions provided for a second plurality of propagation paths of each transmission signal, each of said adaptive array antenna signal processing portions being supplied with said despread signals from said matched filters; and means for combining signals output from said adaptive array antenna signal processing portions to provide one of said output signal(s) of said at least one RAKE receiving portion(s), wherein each of said adaptive array antenna signal processing portion(s) comprises:

means for calculating a weight vector adapted to one of said propagation paths by using a result of said matrix calculation;

a first plurality of multipliers for weighing said despread signals with respective elements of said weight vector to obtain weighed despread signals; and means for combining said weighed despread signals into a transmission signal component that has passed through said one of said propagation paths.

4. A CDMA receiver as defined in claim 3, wherein said matrix calculation means includes means for calculating an inverse matrix of said correlation matrix, wherein each of said adaptive array antenna signal processing portions further comprises means for passing reference signals inserted in said despread signals through respective filters configured to match said reference signals that have passed through said one of said propagation paths to obtain a response vector, and wherein said means for calculating a weight vector comprises means for calculating said weight vector by using said inverse matrix and said response vector.

5. A CDMA receiver of receiving a transmission signal transmitted from each of a first plurality of users and putting out a message signal included in the transmission signal, the CDMA receiver comprising:

a second plurality of antennas;

radio portions, fed by respective antennas, for providing reception signals derived from said respective antennas;

means for calculating a conversion matrix from said reception signals; and means for converting said reception signals by using said conversion matrix to obtain respective converted signals;

adaptive array antenna signal processing portions provided for respective users, each adaptive array antenna signal processing portion being supplied with said converted signals from said radio portions; and detectors, provided for respective users, for each detecting said message signal from an output signal of each adaptive array antenna signal processing portion, wherein each of said adaptive array antenna signal processing portions comprises:

a second plurality of matched filters configured to match a spreading code of each user to provide respective despread signals;

means for maximum-ratio combining said respective despread signals to provide said output signal of each adaptive array antenna signal processing portion.

6. A CDMA receiver as defined in claim 5, wherein said means for maximum-ratio combining said respective despread signals comprises:

means for passing reference signals inserted in said respective despread signals through respective filters configured to match said reference signals to obtain a response vector;

means for weighing said respective despread signals with said response vector to obtain weighed despread signals; and means for combining said weighed despread signals into said transmission signal associated with each user.

7. A CDMA receiver as defined in claim 5, wherein said means for calculating a conversion matrix comprises: means for calculating a correlation matrix from said reception signals; eigen-analyzing said correlation matrix to obtain eigenvalues $\{\lambda_j | j=1, 2, \ldots, M\}$ and eigenvectors $\{e_j | j=1, 2, \ldots, M\}$, where M is a number of antennas; and means for calculating said conversion matrix $\Lambda$, which is defined by:

$$\Lambda = \left[ \frac{e_1}{\sqrt{\lambda_1}} \quad \frac{e_2}{\sqrt{\lambda_2}} \quad \cdots \quad \frac{e_M}{\sqrt{\lambda_M}} \right]^T.$$

8. A CDMA receiver as defined in claim 7, wherein said means for converting said reception signals comprises means for calculating $\Lambda^H \{x1 \; x2 \; \ldots \; xM\}^T$ to obtain a resultant matrix whose elements consists of said respective converted signals, $x1, x2, \ldots, xM$ where are said reception signals.

9. A CDMA receiver as defined in claim 5, wherein said means for maximum-ratio combining said respective despread signals includes means for performing a RAKE reception.

10. A CDMA receiver as defined in any of claims 1, 3 and 5, further comprising:

means for making a test to see if a level of a signal applied to each of said matched filters is as low as noises; and means, responsive to an affirmative result of said test, for preventing said signal from being used subsequently.

11. A CDMA receiver as defined in claim 7, further comprising:

means for making a test to see if a level of each eigenvalue is as low as noises; and means, responsive to an affirmative result of said test, for excluding an element derived from said low-level eigenvalue from said conversion matrix.

12. A CDMA receiver as defined in claim 1 or 3, wherein said means for calculating a weight vector uses an SMI algorithm.

13. A CDMA receiver as defined in claim 1 or 3, wherein said means for calculating a weight vector uses an RLS algorithm.

14. A CDMA receiver as defined in claim 2, wherein said means for obtaining a response vector comprises means for passing said reference signals through respective filters configured to match said reference signals.

15. A CDMA receiver as defined in claim 2, wherein said means for obtaining a response vector comprises means for using said reference signals as said response vector.

16. A CDMA receiver as defined in claim 2, wherein said means for obtaining a response vector comprises:

means for detecting said despread signals in a user data transmission period other than reference signal transmission period; and means for using said detected despread signals as said reference signals to obtain said response vector.

17. A CDMA receiver as defined in any of claims 1, 3 and 5, wherein a long code is used as said spreading code.

18. A method of extracting a transmission signal transmitted from each of a first plurality of users from reception signals derived from a second plurality of antennas constituting an antenna array in a CDMA receiver wherein the reception signals have not yet passed through respective matched filters, the method comprising:

the step of performing a matrix calculation by using said reception signals to provide at least a common correlation matrix; and the steps, executed for each user, of:

passing said reception signals through respective matched filters configured to match a spreading code of each user to obtain respective despread signals;

calculating a weight vector by using a result of said matrix calculation; weighing said respective despread signals with said weight vector to obtain weighed despread signals; and combining said weighed despread signals into said transmission signal associated with each user.

19. A method as defined in claim 18, wherein said matrix calculation includes calculating a inverse matrix of said correlation matrix, wherein the method further comprises the step of obtaining a response vector by using reference signals inserted in said respective despread signals, and wherein said step of calculating a weight vector comprises the step of calculating said weight vector by using said inverse matrix and said response vector.

20. A method of extracting a transmission signal transmitted from each of at least one user from reception signals derived from a second plurality of antennas constituting an antenna array in a CDMA receiver wherein the reception signals have not yet passed through respective matched filters, the method comprising the steps of:

performing a matrix calculation by using said reception signals to provide at least a common correlation matrix; and passing said reception signals through respective matched filters configured to match a spreading code assigned to each of said at least one user to obtain respective despread signals, the method further comprising the steps, executed for each of a plurality of propagation paths of said transmission signal, of:

calculating a weight vector adapted to one of said propagation paths by using a result of said matrix calculation;

weighing said respective despread signals with said weight vector to obtain weighed despread signals; and combining said weighed despread signals into a transmission signal component that has passed through said one of said propagation paths, the method further comprising the step of:

combining said transmission signal components for said at least one user into said transmission signal.

21. A method as defined in claim 20, wherein said matrix calculation includes calculating a inverse matrix of said correlation matrix, wherein the method further comprises the step of passing reference signals inserted in said respective despread signals through respective filters configured to match said reference signals that have passed through said one of said propagation paths to obtain a response vector, and wherein said step of calculating a weight vector comprises the step of calculating said weight vector by using said inverse matrix and said response vector.

22. A method of extracting a transmission signal transmitted from each of a first plurality of users from reception signals derived from a second plurality of antennas constituting an antenna array in a CDMA receiver wherein the reception signals have not yet passed through respective matched filters, the method comprising the steps of:

calculating a conversion matrix from said reception signals; and converting said reception signals by using said conversion matrix to obtain respective converted signals, the method further comprising the steps, executed for each user, of:

passing said respective converted signals through respective matched filters configured to match a spreading code of each user to obtain respective despread signals;

maximum-ratio combining said respective despread signals into said transmission signal associated with each user.

23. A method as defined in claim 22, wherein said step of maximum-ratio combining said respective despread signals comprises the steps of:

passing reference signals inserted in said respective despread signals through respective filters configured to match said reference signals to obtain a response vector;

weighing said respective despread signals with said response vector to obtain weighed despread signals; and combining said weighed despread signals into said transmission signal associated with each user.

24. A method as defined in claim 22, wherein said step of maximum-ratio combining said respective despread signals includes the step of performing a RAKE reception.

25. A method as defined in any of claims 18, 20 and 22, further comprising the steps of:

making a test to see if a level of a signal applied to each of said matched filters is as low as noises; and in response to an affirmative result of said test, preventing said signal from being used subsequently.

26. A method as defined in claim 18 or 20, wherein said step of calculating a weight vector uses an SMI algorithm.

27. A method as defined in claim 18 or 20, wherein said step of calculating a weight vector uses an RLS algorithm.

28. A method as defined in claim 19, wherein said the step of obtaining a response vector comprises the step or passing said reference signals through respective filters configured to match said reference signals.

29. A method as defined in claim 19, wherein said the step of obtaining a response vector comprises the step of using said reference signals as said response vector.

30. A method as defined in claim 19, wherein said the step of obtaining a response vector comprises the steps of:

detecting said despread signals in a user data transmission period other than reference signal transmission period; and using said detected despread signals as said reference signals to obtain said response vector.

31. A method as defined in any of claims 18, 20 and 22, wherein a long code is used as said spreading code.

* * * * *